Oct. 27, 1936.    H. E. BERGEN    2,058,849
FISH PRODUCT AND PROCESS OF TREATING FISH
Filed Jan. 18, 1932    4 Sheets-Sheet 1

INVENTOR,
HAROLD E. BERGEN.
BY Eugene Jacobson.
ATTORNEY

Oct. 27, 1936.　　　　H. E. BERGEN　　　　2,058,849
FISH PRODUCT AND PROCESS OF TREATING FISH
Filed Jan. 18, 1932　　　4 Sheets—Sheet 2

INVENTOR,
HAROLD E. BERGEN.
BY Eugene Jacobson
ATTORNEY

Oct. 27, 1936. H. E. BERGEN 2,058,849

FISH PRODUCT AND PROCESS OF TREATING FISH

Filed Jan. 18, 1932 — 4 Sheets-Sheet 3

INVENTOR,
HAROLD E. BERGEN.
BY Eugene Jacobson
ATTORNEY

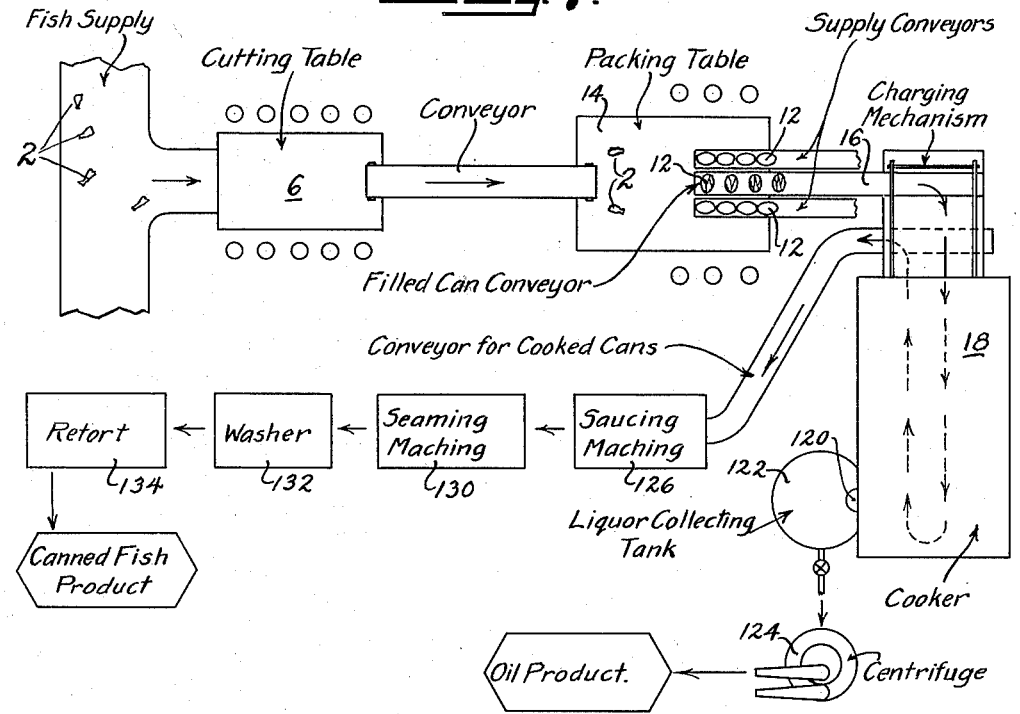
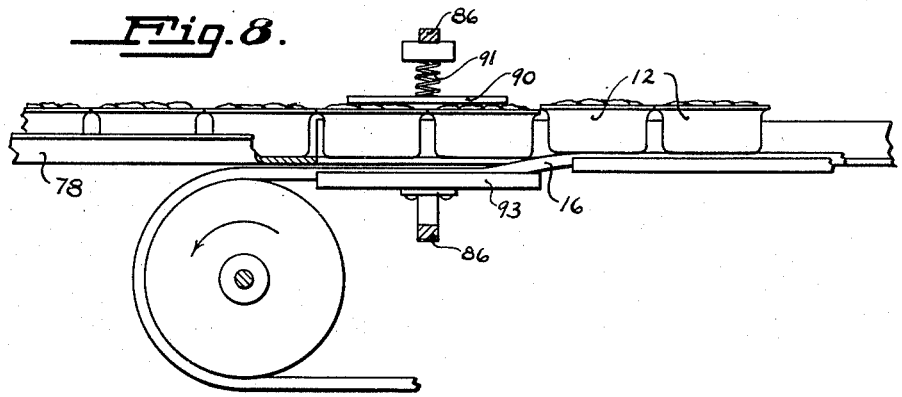

Patented Oct. 27, 1936

2,058,849

UNITED STATES PATENT OFFICE 2,058,849

FISH PRODUCT AND PROCESS OF TREATING FISH

Harold E. Bergen, Pacific Grove, Calif., assignor to K. Hovden Company, Monterey, Calif., a corporation of California Application January 18, 1932, Serial No. 587,251

8 Claims. (Cl. 53—21)

My invention relates especially to an edible fish product and to the cooking, treating and canning of fish, particularly small fatty fish such as large sardines, herring or pilchards.

It is an object of my invention to provide an improved food product, and especially to provide an improved canned fish of the type described. Objects of my invention are to provide a product of the described type improved in appearance, of greater palatability, more easily digestible, and more healthful.

The type of fish to which this invention particularly relates is ordinarily packed in mustard, tomato, or other flavoring sauce. The sauce naturally is and should be of a rich thick homogeneous consistency. When a can of the prior sauced fish is opened, however, the sauce is invariably found thinned out into a heterogeneous and most unappetizing slop. It is an object of my invention to avoid such deterioration of the sauce.

Heretofore the fish, though smothered in flavoring sauce, remained relatively unflavored. It is an object of my invention to produce a pack in which the fish flesh is actually flavored by the sauce; so that the flavor would remain if the sauce were drained off.

Canned fish may be non-absorbent even though its moisture content is low if it be dried out and encrusted. It is an object of my invention to produce a fish pack with sufficiently low moisture content, yet with the flesh in healthy absorbent condition.

It is an object of my invention to increase the palatability of canned fish of the described type. It is an object of my invention to avoid even the usual traces of rancidity and to increase the sweetness of the fish pack. It is an object of my invention to avoid the objectionable so-called "fishy" taste of the pack. It is an object of my invention to retain a maximum of the finer flavors of the fish while diminishing the cruder flavors thereof. Further objects of my invention are to avoid the presence of slime in the pack, to improve the color and to avoid darkened appearance of the fish flesh and fish oil and to eliminate the black coatings of cooked blood which are usually found along the backbone and in the cavity below the head of the fish. It is a further object of my invention to eliminate from the pack any small particles of fish, scales, bone, fins, or other substance which might detract from the wholesome appearance of the pack. It is especially an object of my invention to eliminate impurities from the pack. It is a further object of my invention to improve the odor and "feel" of the canned fish, it being recognized that the odor of food and the "feel" of food in the mouth greatly influence its palatability.

It is an object of my invention to improve the physical condition of the canned fish. Ordinarily the canned fish is fragile; the flesh breaking up within the can before the can is opened and producing an effect similar to that caused by decay or overcooking. Objects of my invention are to retain the natural healthy firmness, texture and solidity of the fish. Further objects of my invention are to retain the original form and body of the fish unswollen, and without other distortion or disruption. Ordinarily the skin of the canned fish is found wrinkled or scraped off in patches and dead in appearance. Objects of my invention are to preserve the natural lustre, texture, smoothness and toughness of the fish skin.

It is an object of my invention to cook and can fish substantially without deteriorating its fatty content.

It is an ancillary object of my invention to recover an increased by-product yield and especially to increase the recovery of fish fats. It is a material object of my invention to extract such large proportion of fat and other fish liquors without crushing, encrusting, or otherwise injuring the form or edible value of the fish. It is a further object of my invention to recover the fish fat in undeteriorated condition.

It is a further object of my invention to teach satisfactory methods and means for obviating the overcooking to which canned fish ordinarily are subjected.

The foregoing objects of my invention refer especially to the resultant product which it is desired to produce. It will be understood however, that objects of my invention also include those of teaching methods, processes, means, and apparatus for accomplishing each of these results separately and in combination. Further objects of my invention are to provide methods and apparatus to treat, cook and can the fish in a more sanitary manner, with less breakage, spoilage, deterioration and loss of time, labor and space and with a saving in expense.

Other and ancillary objects of my invention will be suggested in the following description and in the use and practice of my invention.

In the following description of my invention the product will first be described, the process next generally explained, and thereafter the process will be detailed together with the apparatus which is preferred.

The canned fish product of my invention consists of the whole cooked flesh of large sardines, herring, pilchards or similar naturally fatty fish having substantially less than its natural percentage of fat and watery juices and preferably containing mustard, tomato, or other flavoring material instead. There is substantially no free moisture content; practically all the fish liquors being within the cell walls of the fish flesh. The fish therefore is healthily moist and pervious but not wet, nor is it dried out and encrusted. The fish is, moreover, definitely absorbent of the flavoring material in which it is packed. The flavoring sauce is deeply absorbed within the fish flesh. The fish flesh is firm. Fat remaining in the fish and any free oil in the can is unoxidized, is not dark colored, and is substantially not broken down or "cracked" chemically as by excessive exposure to heat. The fish is substantially free of blood, slime, or other impurities. The fish skin is natural in texture and appearance, is firmly adherent to the flesh and is not wrinkled. The sauce in the can is of a thick homogeneous consistency, and is not thinned out or contaminated by slime, broken particles or by exudation from the fish. The inside of the can is clean and free of deposits of gluey or gelatinous matter, blood, or other substance.

In my improved method of processing fish, the fish is treated by removal of the requisite amount of fat and liquors and impurities without however unduly breaking down the cellular structure thereof, and thereafter sealing the fish in receptacles containing flavoring sauce. Conventional practices in canning fish of the described type are believed either to break down the cellular structure so that the cell walls are broken and/or rendered substantially impervious thus preventing absorption or retention of flavoring sauce by the fish, or else they leave the broth content so high and in such condition that a substantial amount of broth gradually oozes out of the fish and remains as a free slop in the canned pack. My invention removes liquors from the fish to a point where no more will ooze out into the completed pack and then beyond that to a point where the fish becomes definitely absorbent without however destroying absorbability or cellular structure, so that the flavoring sauces in the can will be drawn into the fish. The fish flesh absorbs the sauce into the voids from which the liquors were removed. The fish is preferably sauced when hot, preferably but not necessarily in hot sauce, and as it cools it draws in the sauce. The fish remains in the sealed cans ordinarily for months, allowing ample time for the sauce to penetrate into the fish. It should be emphasized, however, that soaking alone will not cause proper absorption of the sauces unless the excess fats and broth have been removed to make place for them and unless the flesh is in absorbent condition.

In addition to removing the excess fats and liquors from the fish, I also thoroughly cleanse the fish pack by alternately bathing and draining it during the cooking process. This washing removes any impurities which might have adhered to the raw fish after even careful cleaning and washing, and it also removes the blood, slime, other impurities and fish fragments which by other processes would remain in or adhering to the fish or elsewhere within the container or sauce in which the fish is packed.

The process of my invention will next be set forth in greater detail and the apparatus of my invention will be described with reference to the drawings wherein:

Fig. 1 is a side elevation of the cooker of my invention with portions of the general layout of mechanism therein shown by dash lines. Details are omitted for clarity of illustration. The cooker is foreshortened in the drawings by breaking out the entire middle portion and illustrating only the two ends.

Fig. 7 is a schematic plan view of the apparatus of my invention showing its relative placement and illustrating the sequence of steps in my process of treating fish.

Fig. 8 is a side elevation of the can-feeding conveyor which delivers cans to the cooker, with certain details thereof shown in section.

As is customary in canning fish, the raw fish 2 is cut and the entrails removed at cutting tables 6 or by a mechanical eviscerator, and is washed in a tank of ocean water. The process of my invention obviates the necessity for brining, drying or frying or otherwise precooking the fish and I prefer to pack the whole raw fishes directly into the containers 12, in this instance pound oval tins, in which the fish is marketed. The cans are packed at a packing table 14 and are filled overfull to compensate for subsequent shrinkage. The uncovered filled cans are then taken directly by a conveyor 16 to the cooker 18 into which they are charged by a mechanical charging device subsequently to be described in detail. The cans of fish are brought gradually up to cooking temperature.

The fish are then cooked, preferably out of the presence of air in steam preferably at a temperature of about two hundred twelve degrees Fahrenheit and atmospheric pressure. The fish are drained during the cook, but not continuously and are also bathed during the cook. This is accomplished by controlling the quality, i. e. wetness or dryness of the steam, by observation so that the fish remain moist and a certain amount of liquid collects in the cans. The cans of fish should not be allowed to dry out and leave deposits on the fish and in the cans. During the cook the cans are supported rightside up for a time to collect a body of liquid therein and then are turned upside down for a time to drain while cooking. The liquids collecting in the cans during the non-draining phase of the cook serve as a vehicle for discharging viscous and sticky materials and small solid particles which would otherwise remain in the cans. Any air and gases on the other hand which might be trapped in the cans during the draining phase of cook are released during the non-draining phase. The cycle of bathing and draining is repeated several times during the cook. For a total cook of about an hour, a periodicity of approximately seven minutes draining cook and seven minutes non-draining cook with four complete cycles of alternation is found desirable. Preferably the process is initiated with a non-draining phase of cook and terminated with a draining phase.

Figure 1:
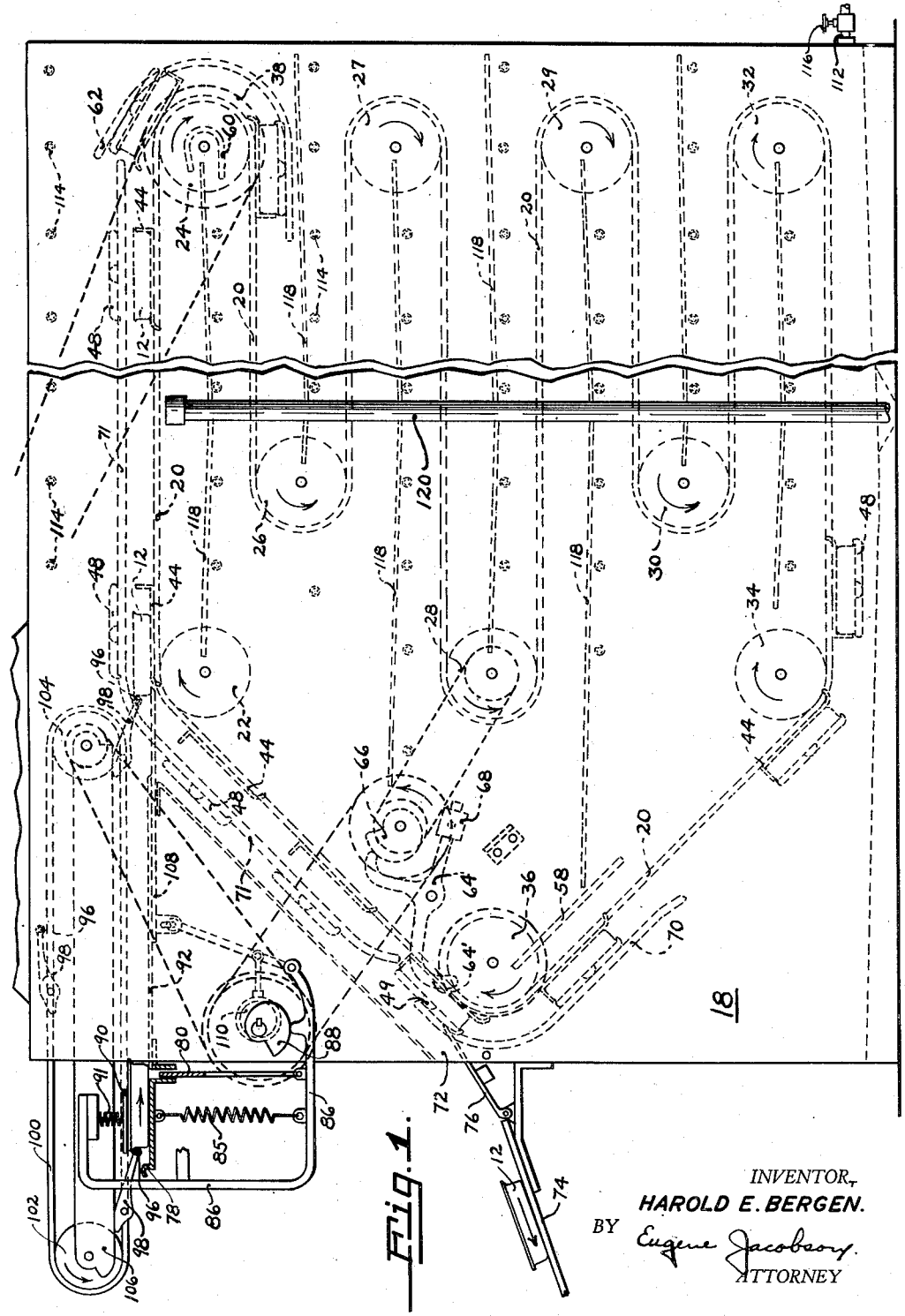

The cooker 18 is a generally elongated rectangular-sectioned box shown appreciably foreshortened in Fig. 1.

Means are provided within the cooker 18 for supporting the cans of fish for a predeterminable length of time, then inverting the cans of fish and supporting them in that position for a predetermined time, then reinverting them, and repeating the same cycle of inversions to and from drain-cook and non-drain cook position a given number of times. An endless twin chain conveyor consisting of two laterally spaced chains 20 is guided by a plurality of pairs of sprockets 22, 24, 26, 27, 28, 29, 30, 32, 34, and 36 to travel horizontally back and forth longitudinally of the cooker in a descending series of four traverses and four underpasses progressing from top to bottom of the cooker; and then back along a steep double incline from the lowermost pair of sprockets 34 at the starting end of the cooker and over guide sprocket 36 directly to the uppermost pair of sprockets 22 at the same end of the cooker. The conveyor is driven in the direction indicated by arrows in Fig. 1 by a selective speed electric motor (not shown) or other convenient power source through reduction gearing (not shown) belted to a driving pulley 38 on the shaft of drive sprocket 24 for the conveyor 20. Safety overload shearing pins (not illustrated) are provided as customary, in the driving mechanism to guard against breakage in event of jamming, and conventional means (not shown) are provided in combination with the guide sprockets for taking up slack in the chains 20.

The conveyor chains 20 are of purely conventional type, each consisting of a series of standard links joined by pins. Guide rollers 40 are mounted on elongated link-joining pins of conveniently spaced links as is conventional practice, and a pair of guide rails 41 for the rollers are attached to the side walls of the cooker, one along the path of each of the conveyor chains.

Figure 4:
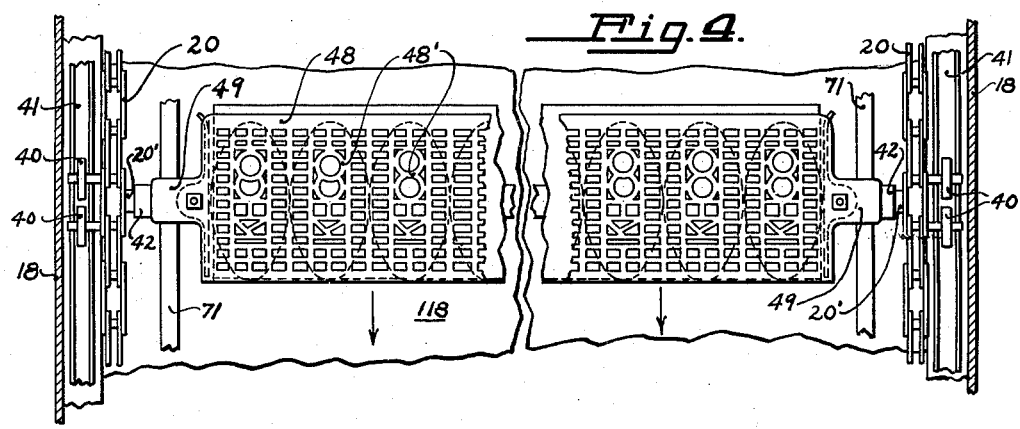
Fig. 4 is a plan view of one of the can carriers on the first pass of its conveyor.
Figure 3:
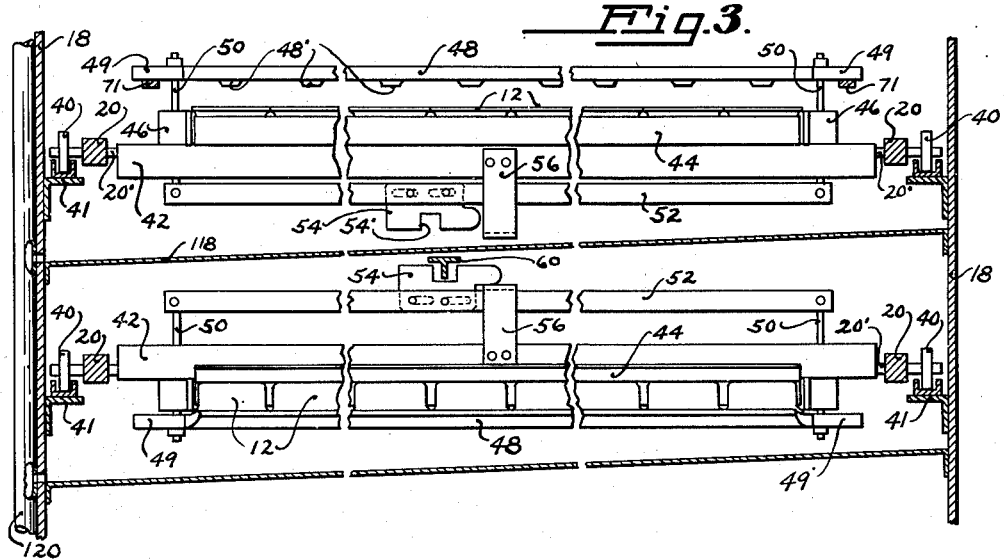
Fig. 3 is a transverse vertical section through the first two flights of the can-carrying conveyor.

A series of can carriers of my invention are attached at equally spaced intervals, to the pair of chains. The can carriers extend at right angles to the direction of chain travel and are bolted to apertured lugs 20' formed on every ninth link of both chains. Guide rollers 40 are also provided at both pivots of each of these links. Each can carrier is supported by a channel bar 42 connecting the pair of chains 20 and connected at its opposite ends to the chains by bolts through the chain link lugs 20'. (See Figs. 3 and 4.)

A can carrier base or table 44 of sheet metal is welded or otherwise suitably attached to the upper face or web of each channel bar support 42. The tables 44 are but slightly shorter than the supports 42 and are substantially as wide as the major axis length of one sardine can 12. The forward edge (in the direction of chain travel) of each table 44 is turned up to form a low rim. The rear or trailing edge is curved downward very slightly to form a lip for facilitating loading and discharge of cans. Narrow end stiffeners 46 (see Fig. 3) are welded or otherwise suitably attached to each end of each table 44. The end stiffeners also form a low rim at the table ends.

Each can carrier is provided with a cast, stamped or other suitable metal grille top 48 above and substantially co-extensive with its table 44, to support the cans while the conveyor is in the underpasses of its travel. The cans at these times are upside down, and the grille tops 48 hold the cans on the conveyor and prevent the fish from dropping out of the cans, while permitting free drainage and run-off of liquors from the cans out through the open-work of the grilles. The rear or trailing edge of each grille top is curved slightly downward toward the table 44 to prevent the cans from sliding backward out of the can carrier after the top is clamped down.

Figure 5:
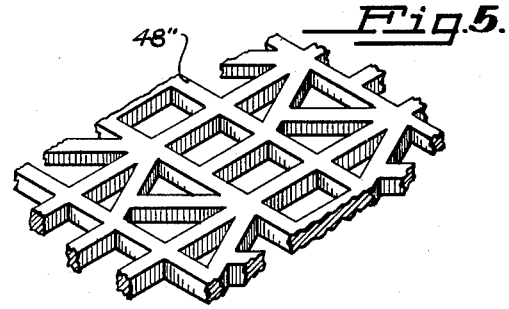
Fig. 5 is perspective fragment of a modified form of grille-top for the can carriers.

The grille tops 48 have a plurality of trademark brands 48' formed therein, positioned one over each can in the can carrier. When the grille top is clamped down, and especially when the cans are upside-down, a trade-mark is cooked directly into the fish, so that when the can is opened the surface of the fish will be seen to bear the canner's brand. The brands 48' project slightly below the rest of the grille surface; in this instance being cast into or welded onto the grille itself. In Fig. 5 an alternative form is shown in which the entire grille top 48" is cast or stamped into a web of letters of the trade-mark.

Figure 2:
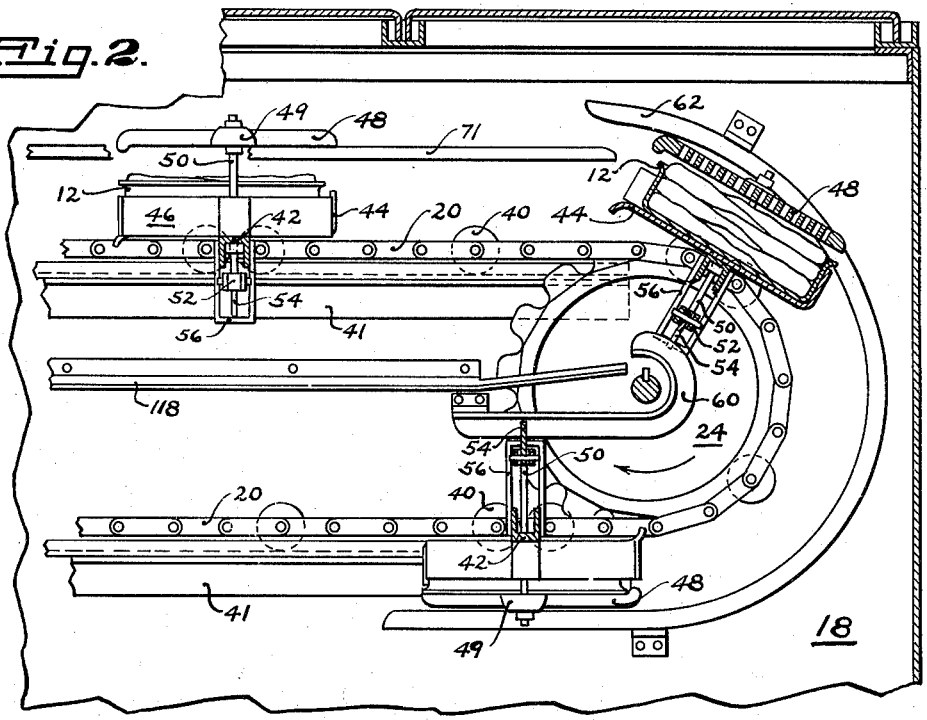
Fig. 2 is a side elevation of the end of the first pass of the can-carrying conveyor and associated parts inside the cooker in detail.
Figure 6:
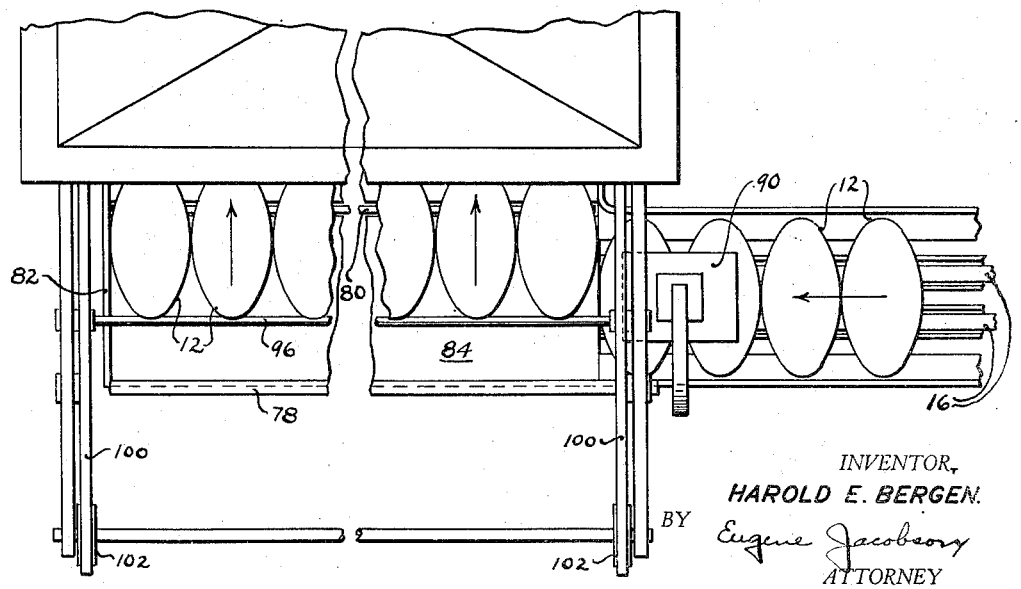
Fig. 6 is plan view of the cooker-charging mechanism. The filled cans of fish are indicated by ovals; the fish therein being omitted for simplicity of illustration.

Means are provided for locking the grille tops 48 in closed position to hold the cans. The grille tops are supported at each end by rods 50 (Figs. 2 and 3), the reduced threaded ends of which rods extend up through apertures in integral end lugs 49 (Fig. 3) of the grille tops, and are bolted solidly thereto. The lower end of each rod 50 extends down through a guide hole in the end stiffener 46 of table 44 and through a hole in the channel bar support 42 of the can carrier, projecting below the support 42 and terminating in a squared, transversely apertured base. The bases of the two rods 50 of each carrier are connected by a tie rod 52 extending underneath from end to end of the can carrier. A locking shoe 54 is slidably mounted on the tie rod 52 of each carrier for longitudinal movement therealong. The toe of shoe 54 is slidable under the loop of a stiff U-shaped metal strap 56 fixed to and depending from the can carrier support 42. When the toe of shoe 54 is slid in under the loop of the U strap 56, the tie rod and with it the grille top 48 is locked in lowermost or closed position. When the shoe is withdrawn from below the U strap, the grille cover can be raised to open position, in which position the toe of shoe 54 could be engaged within the loop of the U strap to lock the grille top in open position. In this embodiment, however, alternative means have been provided for holding the grille top in open position. The shoe 54 is actuated back and forth in proper relation to the conveyor cycle by means of fixed track cams 58 and 60 in the cooker coacting with the archlike groove at 54' of the shoe 54. The cam 58 for unlocking the grille cover is fixed in the path of the conveyor at a place near the cooker exit, and the cam 60 is placed just beyond the end of the first or topmost pass of the conveyor to lock the grille top in closed position.

The aforedescribed means for locking the grille tops in position is to be distinguished from means which are provided for moving the grille tops to open and closed positions. For moving the grille tops to closed position, a fixed cam 62 is provided at the end of the first or topmost pass of the conveyor. The cam 62 consists of a double track in the path of the end lugs 49 of the grille tops 48. The cam 62 is curved into a segment of a spiral the geometric origin of which would be concentric with the shaft of conveyor sprockets 24. The grille covers ride under the large diameter portion of the spiral cam 62 and are forced to closed position by the convergence of the spiral. The locking cam 60 comes into play before the grille covers leave closing cam 62.

Special means are provided for moving the grille tops suddenly to open position to unload the can carriers precisely at the cooker exit and to facilitate rapid discharge of cans therefrom (see Fig. 1). A pair of levers 64 inside the cooker near guide sprocket 36 at the exit point of the cooker are pivoted with the actuating arms 64' thereof just under the path of end lugs 49 of the grille covers 48. A synchronized cam 66 holds the levers out of the path of the grille covers until each can carrier rides up to its discharge point immediately over actuating arms 64', when the cam 66 suddenly releases the levers and counter weights 68 thereon throw the actuating arms of the levers up sharply to strike against lugs 48 and thus to quickly raise the grille covers.

The cams 66 are driven in synchronism with the conveyor chains 20 by a driving connection (in this instance a drive chain and sprockets) from the shaft of guide sprockets 28 of the main conveyor chains. The gear ratio of this driving connection is calculated to give one complete revolution to the cam as the main cooker conveyor moves through a distance equal to the spacing between successive can carriers thereon. A suitable timing adjustment is provided, in this instance merely a set-screw, locking one of the drive sprockets adjustably to its shaft.

A fixed cam 70 analagous to the closing cam 62, is provided to hold the grille covers closed from the time they are unlocked by cam 58 until they are ready to be opened by the levers 64. Another fixed cam 71 in the cooker just beyond cam 70, holds the grille covers open from the discharge point past the cooker entrance and until they are ready to be closed by cam 62.

When released from the can carriers, the cans slide backward (i. e. counter to direction of conveyor travel) off the conveyor and out of an exit opening provided at 72 in the cooker end wall onto an inclined runway 74. There unavoidably is a gap between the runway 74 and the tables 44 of the can carriers. A pivoted shelf 76 is provided to bridge this gap. The shelf is free to move up as a can carrier comes up underneath it, and of its own weight drops down behind the can carrier to provide an inclined bridge for the discharged cans.

Means are provided for automatically loading the cans onto the can carriers. The conveyor 16 which carries the filled cans of fish to the cooker travels across the charging end of the cooker on a level with and at right angles to the direction of movement of the top flight of the can carriers in the cooker. The conveyor 16 carries the cans aligned with the minor axes of their ovals in a single row into a corral as wide as the length of one can and as long as the width of ten cans. The corral is formed by side walls 78 and 80, an end wall 82, and floor 84. The wall 80 of the side of the corral nearest the cooker is a disappearing wall normally held up into position by a spring 85 but withdrawable by the follower arm 86 of a cam 88. The cam 88 is driven in proper synchronism to the conveyor chains by a driving connection to the shaft of cams 66. The cam 88 is driven at the same speed as cam 66, and a conventional timing adjustment is provided in the driving connection between the two.

When the disappearing side wall 80 is withdrawn from the corral if the long line of cans on conveyor 16 kept pushing there might be a tendency for cans to buckle out of line from their corral. Accordingly a movable can stop 90 is provided at the entrance to the corral. The can stop is a broad flat horizontal plate supported at its center by a spring 91 which gives it freedom to set flat upon the tops of the cans. The stop 90 is actuated by the same cam follower arm 86 that operates the disappearing wall of the can corral. As the wall 80 is withdrawn, stop 90 is pulled down on top of the two cans on conveyor 16 immediately behind the tenth can in the can corral. That short section 93 of the standard guide rails for conveyor 16 which is beneath the area of the stop 90, is movable so that the portion of conveyor 16 guided by it can be depressed out of contact with the cans when the stop is pulled down. The movable section of the guide rails is also actuated by the cam follower arm 86.

A horizontal shelf 92 extends from the can corral to the cooker entrance, and means are provided for shoving the cans from the corral across this shelf into place in the can carriers within the cooker. Pusher bars 96 substantially the same length as a can carrier, are mounted, driven and synchronized to sweep ten cans at a time from the can corral, along the shelf 92, and into place in each can carrier as it comes up to the cooker entrance. The pusher bars 96 are supported at their ends by the ends of arms 98 which in turn are pivoted at equal intervals to a pair of parallel drive chains 100 having a level traverse above the entire distance from corral to cooker. Sprockets 102 and 104 are provided for chains 100 and are driven in synchronism with the main conveyor chains 20 by a driving connection from the shaft of cam 88. The gear ratio of the driving connection is designed to give one complete pusher bar stroke from can corral to can carrier as the main cooker conveyor chain moves a distance equal to the spacing between successive can carriers. A conventional timing adjustment is provided in the driving connection. The arm-carrying links of chains 100 are guided by guide rollers and rails (not shown) in conventional manner, and a guide rail 106 is provided to constrain the free ends of pusher bar arms 98. The pusher bars 96 are held by this guide rail at a level below the top of the cans and high enough above the floor of the corral to just clear the low shelf 78 thereof.

There unavoidably is a gap between the loading shelf 92 and the can carriers. This is bridged by a sliding counter shelf 108 driven in synchronism with the main cooker conveyor by an eccentric 110 on the same shaft that carries the cam 88 for controlling the disappearing wall of the can corral. The charging mechanism is synchronized so that as a can carrier rides up to the cooker entrance, the can stop 90 is pulled down, the movable side wall 80 of the corral is withdrawn, the sliding shelf 108 is slid in to bridge the gap to the can carrier, and a pusher bar 96 is drawn across the loading shelf to shove ten cans into the can carrier.

The cooker is maintained at a temperature of approximately two hundred and twelve degrees Fahrenheit and air is excluded therefrom by steam at atmospheric pressure. The steam under considerable pressure from a boiler (not shown) enters a header 112 and flows from it to a plurality of multi-apertured distributing pipes 114 positioned above the rightside-up passes of the main conveyor and below the upside-down passes. Steam supply is controlled by a throttling valve 116 in the header 112. Steam in the header is substantially saturated and at considerable pressure, so that control of steam supply by the valve 116 serves also to control its quality. Generous supply of steam would produce a superheat in the cooker and meager supply would leave the cooker filled with wet steam. This latter condition is preferred. As is conventional practice, these same pipes are employed for washing down the cooker with cleaning solution after a run.

It will be observed that the can-carrying conveyor 20 supports the cans rightside-up upon their entrance to the cooker and during the first pass of the conveyor. The cans are turned upside-down at the end of the first pass and are supported upside-down during the second pass of the conveyor. At the end of the second pass they are righted again, and this cycle continues, carrying the filled cans of fish alternately rightside-up and upside down; the last pass of the conveyor being upside down, so that the cans are drained immediately prior to discharge from the cooker. Speed of the conveyor is adjustable by the selective speed of the driving motor (or a selective-speed transmission could be provided instead), and it is preferred to adjust the speed to give the cans of fish a total cook of nearly an hour from their entrance to discharge from the cooker. This speed allows about seven minutes for each pass of the conveyor.

It is desired to space the can carriers closely on the conveyor to conserve space in the cooker. However the spacing should be sufficient so that spillage from each can carrier will clear the cans in the carrier immediately preceding it on the conveyor as the can carriers go around the sprockets. I prescribe a spacing along the chain from center to center of adjacent can carriers of fourteen inches with sprockets of thirteen and one quarter inch pitch diameter and cans six and a half inches long measured on the major axis of the can oval. In more general terms, the spacing center to center of the can carriers should be slightly greater than 3.1416 times one half the radius measured from the axis of a sprocket to the center of a can carrier table turning about the sprocket. The drawings are not intended to portray this relative spacing—it having been deemed advisable to magnify the can-carriers and reduce the size of sprockets in order to show sufficient detail most effectively.

Drip pans 118 are placed below each pass of the conveyor to catch liquors spilling from cans above and to prevent soiling the outside of cans below them in the cooker. The drip pans slope to drain gutters which communicate with a closed liquor drain 120 leading to a collecting and settling tank 122 (Fig. 7) from which the fish oil is withdrawn, purified by centrifuging in a centrifugal separator 124, and then packed and marketed separately as a by-product. The oil separated in this manner is of far higher quality than that which has been subjected to long cooking as by other processes. Where economically feasible, valuable constituents can be purified and separated out of the watery residue of the fish liquors remaining after removal of the oil therefrom.

Upon their discharge from the cooker, the cans progress (see Fig. 7) directly to the saucing machine 126 where they are sauced while still hot with hot sauce, and then to the seaming machine 130 where they are lidded and sealed. The sealed cans of fish are then washed in a washer 132, and retorted in a retorter 134, from which they emerge ready, after cooling, for labeling and casing for shipment and sale.

I have described one embodiment of my invention in detail, but it is emphasized that this embodiment is illustrative and not inclusive of all the forms my invention may assume. Certain of the objects, or certain portions or combinations of the objects of my invention may be attained with the use of less than all its advantageous features and steps or with modifications within its purview. It is petitioned that my invention be limited only by the claims constituting its final determination.

I claim:—

1. In a method of preparing canned fish, before sealing the fish in containers, the steps of draining said fish for a time while cooking while maintaining the fish in moist condition and of cooking said fish for a time without draining without allowing the fish to cool off between the draining and non-draining portions of the cook.

2. In a method of preparing canned fish, after packing but before sealing the fish in containers, the steps of bathing said fish for a time while cooking and of cooking said fish for a time without bathing without allowing the fish to cool off between the bathing and non-bathing portions of the cook.

3. In a method of treating fish the separate steps of draining and of washing without draining all while cooking said fish.

4. In a method of preparing fish, the steps of intermittently bathing while cooking said fish; each of said bathing steps being performed with liquid relatively uncontaminated by the previous bathing.

5. In a method of preparing fish, the steps of intermittently bathing and draining while cooking said fish.

6. In a method of canning fish, the steps of packing cleaned raw fish into uncovered containers, bringing said containers of raw fish gradually up to a cooking temperature of about two hundred and twelve degrees Fahrenheit in wet saturated steam while supporting said containers rightside-up for a period of between five and ten minutes and collecting a body of liquid in the containers, then inverting said containers of fish into draining positon onto a grille while continuing to subject to the action of said steam for between five and ten minutes and collecting the liquids draining therefrom, then restoring said containers of fish to rightside-up position and allowing another bath of liquid to collect therein while cooking as before, and repeating the aforerecited cycle of cooking alternately while bathing and while draining said fish for a total period of about an hour; the last of said cycles terminating with a draining phase of cook; then adding hot flavoring sauce to said containers of fish and then covering and sealing said containers of sauced fish.

7. In a method of preparing canned fish, the steps of packing fish into containers and before sealing said containers, the steps of cooking said containers of fish in wet steam for a time in draining position and for a time in non-draining position and collecting a body of condensate in the containers during the non-draining phase of cook.

8. In a continuous process of treating fish the steps of continually feeding uncovered cans of fish into a cooking zone, and continuously cooking while continually washing the fish in said cans in liquid relatively uncontaminated by previous washing.

HAROLD E. BERGEN.